United States Patent [19]
Montgomery et al.

[11] Patent Number: 6,157,966
[45] Date of Patent: Dec. 5, 2000

[54] SYSTEM AND METHOD FOR AN ISO7816 COMPLAINT SMART CARD TO BECOME MASTER OVER A TERMINAL

[75] Inventors: Michael A. Montgomery, Austin, Tex.; Scott B. Guthery, Redmond, Wash.; Bertrand du Castel, Austin, Tex.

[73] Assignee: Schlumberger Malco, Inc., Del.

[21] Appl. No.: 09/107,033

[22] Filed: Jun. 29, 1998

Related U.S. Application Data

[60] Provisional application No. 60/051,326, Jun. 30, 1997.

[51] Int. Cl.⁷ .............................. G06F 13/10; G06F 13/14; G06F 13/36
[52] U.S. Cl. .................................... 710/8; 710/5; 710/11; 710/48; 710/36; 235/375; 235/380
[58] Field of Search .............................. 710/11, 240, 36, 710/31, 8, 5, 15, 110, 100, 48; 235/438, 380, 492, 375; 705/13, 408; 455/558

[56] References Cited

U.S. PATENT DOCUMENTS

| | | | |
|---|---|---|---|
| 3,977,785 | 8/1976 | Harris | 355/133 |
| 4,168,396 | 9/1979 | Best | 380/4 |
| 4,256,955 | 3/1981 | Giraud et al. | 235/380 |
| 4,278,837 | 7/1981 | Best | 380/4 |
| 4,465,901 | 8/1984 | Best | 380/4 |
| 4,562,306 | 12/1985 | Chou et al. | 380/4 |
| 4,598,810 | 7/1986 | Shore et al. | 194/205 |
| 4,634,807 | 1/1987 | Chorley et al. | 380/4 |
| 4,650,975 | 3/1987 | Kitchener | 235/375 |
| 4,688,169 | 8/1987 | Joshi | 340/825.34 |
| 4,725,079 | 2/1988 | Koza et al. | 283/73 |
| 4,748,561 | 5/1988 | Brown | 711/164 |
| 4,777,355 | 10/1988 | Takahira | 235/380 |
| 4,797,543 | 1/1989 | Watanabe | 235/492 |
| 4,877,947 | 10/1989 | Mori | 235/381 |
| 4,890,319 | 12/1989 | Seth-Smith et al. | 380/5 |
| 4,890,321 | 12/1989 | Seth-Smith et al. | 380/20 |
| 4,926,480 | 5/1990 | Chaum | 380/23 |
| 4,937,740 | 6/1990 | Agarwal et al. | 364/200 |
| 5,064,999 | 11/1991 | Okamoto et al. | 235/379 |
| 5,068,894 | 11/1991 | Hoppe | 380/23 |
| 5,123,045 | 6/1992 | Ostrovsky et al. | 380/4 |
| 5,126,541 | 6/1992 | Shinagawa | 235/438 |
| 5,149,945 | 9/1992 | Johnson et al. | 235/380 |
| 5,195,130 | 3/1993 | Weiss et al. | 379/98 |
| 5,247,164 | 9/1993 | Takahashi | 235/492 |
| 5,247,575 | 9/1993 | Sprague et al. | 380/9 |
| 5,375,240 | 12/1994 | Grundy | 713/200 |
| 5,386,369 | 1/1995 | Christiano | 364/464.01 |

(List continued on next page.)

FOREIGN PATENT DOCUMENTS

| | | |
|---|---|---|
| 0 356 237 A2 | 2/1990 | European Pat. Off. . |
| 0 380 377 A1 | 8/1990 | European Pat. Off. . |
| 0 423 035 A1 | 4/1991 | European Pat. Off. . |

(List continued on next page.)

OTHER PUBLICATIONS

"NetChex", Netl, Inc., Home Page (Internet Feb. 1997).

"Mondex International", Mondex International Limited, Home Page (Internet Feb. 1997).

(List continued on next page.)

*Primary Examiner*—Thomas C. Lee
*Assistant Examiner*—Katharina Schuster
*Attorney, Agent, or Firm*—Danita J. M. Maseles; Pehr B. Jansson

[57] ABSTRACT

A smart card comprises a microcontroller, a memory unit, a storage unit, and a communications unit. The smart card may be connected to a terminal, which is in turn may be connected to a host computer and/or a network. The smart card is configured to initiate communications with the terminal, which enables the smart card to control the terminal, host computer, or network and to access the resources connected to the terminal, host computer, or network. A communications protocol defines the commands that the smart card can send and allows the smart card to communicate using asynchronous or logical asynchronous communication.

12 Claims, 8 Drawing Sheets

U.S. PATENT DOCUMENTS

| | | | |
|---|---|---|---|
| 5,406,064 | 4/1995 | Takahashi | 235/492 |
| 5,406,380 | 4/1995 | Teter | 358/332 |
| 5,412,191 | 5/1995 | Baitz et al. | 705/5 |
| 5,420,405 | 5/1995 | Chasek | 235/379 |
| 5,440,631 | 8/1995 | Akiyama et al. | 380/4 |
| 5,444,779 | 8/1995 | Daniele | 380/3 |
| 5,448,045 | 9/1995 | Clark | 235/382 |
| 5,461,217 | 10/1995 | Claus | 235/380 |
| 5,500,517 | 3/1996 | Cagliostro | 235/486 |
| 5,509,070 | 4/1996 | Schull | 380/4 |
| 5,530,520 | 6/1996 | Clearwater | 399/366 |
| 5,532,920 | 7/1996 | Hartrick et al. | 707/500 |
| 5,537,474 | 7/1996 | Brown et al. | 380/23 |
| 5,544,086 | 8/1996 | Davis et al. | 364/408 |
| 5,550,919 | 8/1996 | Kowalski | 380/23 |
| 5,590,197 | 12/1996 | Chen et al. | 380/24 |
| 5,602,743 | 2/1997 | Freytag | 705/408 |
| 5,604,802 | 2/1997 | Holloway | 380/24 |
| 5,613,012 | 3/1997 | Hoffman et al. | 382/115 |
| 5,613,159 | 3/1997 | Colnot | 710/11 |
| 5,650,761 | 7/1997 | Gomm et al. | 235/381 |
| 5,689,565 | 11/1997 | Spies et al. | 380/25 |
| 5,692,132 | 11/1997 | Hogan | 395/227 |
| 5,734,150 | 3/1998 | Brown et al. | 235/381 |
| 5,742,756 | 4/1998 | Dillaway et al. | 395/186 |
| 5,761,306 | 6/1998 | Lewis | 380/21 |
| 5,768,419 | 6/1998 | Gundlach et al. | 395/187.01 |
| 5,811,771 | 9/1998 | Dethloff | 235/380 |
| 5,815,657 | 9/1998 | Williams et al. | 395/186 |
| 5,822,517 | 10/1998 | Dotan | 395/186 |
| 5,841,866 | 11/1998 | Bruwer et al. | 380/23 |
| 5,844,218 | 12/1998 | Kawan et al. | 235/380 |
| 5,844,497 | 12/1998 | Gray | 340/825.34 |
| 5,852,290 | 12/1998 | Chaney | 235/492 |
| 5,887,266 | 3/1999 | Heinonen et al. | 455/558 |
| 5,889,941 | 3/1999 | Tushie et al. | 395/186 |
| 5,892,902 | 4/1999 | Clark | 395/187.01 |
| 5,901,303 | 5/1999 | Chew | 235/492 |
| 5,915,226 | 6/1999 | Martineau | 455/558 |
| 5,923,884 | 7/1999 | Peyret et al. | 395/712 |
| 5,937,068 | 8/1999 | Audebert | 380/23 |
| 6,003,014 | 12/1999 | Lee et al. | 705/13 |
| 6,006,303 | 12/1999 | Barnaby et al. | 710/244 |

FOREIGN PATENT DOCUMENTS

| | | |
|---|---|---|
| 0 427 465 A2 | 5/1991 | European Pat. Off. . |
| 0 662 674 A1 | 7/1995 | European Pat. Off. . |
| 0 665 486 A2 | 8/1995 | European Pat. Off. . |
| 0 696 121 A1 | 2/1996 | European Pat. Off. . |
| 0 717 338 A1 | 6/1996 | European Pat. Off. . |
| 0 829 828 A1 | 3/1998 | European Pat. Off. . |
| 0889393 A2 | 1/1999 | European Pat. Off. . |
| 2 605 770 | 4/1988 | France . |
| 2637710 | 4/1990 | France . |
| 2 667 171 | 3/1992 | France . |
| 2 667 419 | 4/1992 | France . |
| 2 701 133 | 8/1994 | France . |
| 2059937 | 2/1990 | Japan . |
| 2 191 029 | 12/1987 | United Kingdom . |
| 2 261 973 | 6/1993 | United Kingdom . |
| WO 96/25724 | 8/1996 | WIPO . |
| WO 98/19237 | 5/1998 | WIPO . |

OTHER PUBLICATIONS

"Electronic Payment Schemes", Dr. Phillip M. Hallam–Baker, World Wide Web Consortium (Internet Feb. 1997).

"DigiCash", DigiCash bv, Home Page (Internet Feb. 1997).

"CyberCash", CyberCash, Inc., Home Page (Internet Feb. 1997).

Phillip M. Hallam–Baker, "Micro Payment Transfer Protocol (MPTP) Version 0.1", W3C Working Draft, Nov. 22, 1995.

"Secure Electronic Transaction (SET) Specification", Book 2: Technical Specifications, Draft for Public Comment, Feb. 23, 1996, pp. 1–10; 129–186.

Blaze, M., "High–Bandwidth Encryption with Low–Bandwidth Smartcards", in *Fast Software Encryption: Third Int'l Workshop* (ed. D. Gollman), Feb. 1996.

"The Copyright Website" Home Page (Internet Jul. 1997).

"Intellectual Property: The Property of the Mind", The Economist, Jul. 27, 1996, pp. 57–59.

Lehman, B., "Intellectual Property & the Nat'l. Information Infrastructure", U.S. Patent and Trademark Office, Sep. 1995, pp. 177–200.

"CCC Online", Copyright Clearance Center, Inc. (Internet Jul. 1997).

"IBM Cryptolope Containers", IBM infoMarket, International Business Machines Corporation (Internet Aug. 1997).

"IBM infoMarket Rights Management Overview", IBM infoMarket, International Business Machines Corporation (Internet Aug. 1997).

"WIBU Systems Copy Protection", WIBU–Systems AG (Internet Feb. 1997).

"Microsoft Authenticode", Microsoft Corporation (Internet Feb. 1997).

"McAfee Network Security & Management", McAfee Associates Inc. (Internet Feb. 1997).

"SoftLock Services' Home Page", SoftLock Services, Inc. (Internet Feb. 1997).

Stephen T. Kent, "Protecting Externally Supplied Software in Small Computers", Massachusetts Institute of Technology, Sep. 1980, pp. 2–8, 12–39, 67–76 and 212–236.

R. Mori and M. Kawahara, "Superdistribution: The Concept and the Architecture", The Transactions of the IEICE, vol. E73, No. 7, Jul. 1990, pp. 1133–1146.

John Kelsey and Bruce Schneier, "Authenticating Outputs of Computer Software Using a Cryptographic Co–Processor", Proceedings of CARDIS '96, Amsterdam (1996).

Federal Information Processing Standards Publication 190, "Annoucing The Guideline For The Use Of Advanced Authentication Technology Alternatives", Sep. 28, 1994.

Oded Goldreich and Rafail Ostrovsky, "Software Protection and Simulation on Oblivious RAM's", Journal of the ACM, vol. 43, No. 3, May 1996, pp. 431–473.

Trent Jaeger and Aviel D. Rubin, "Protocols for Authenticated Download to Mobile Information Appliances", The University of Michigan, Dept. of Electrical Engineering & Computer Science, Dec. 1995.

Wingfield et al., "News: Java Brews Trouble for Microsoft", www.javaworld.com/javaworld, Nov. 1995, pp. 1–2.

Blundon, "The Center of the Universe is a Database", www.javaworld.com/javaworld, Jul. 1996, pp. 1–5.

Gosling, "Audio/Video Sequence of Invited Presentations", www.5conf.inria.fr, May 1996, pp. 1–4.

Sandhu et al., "Authentication, Access Control, and Audit", ACM Computing Surveys, vol. 28, No. 1, Mar. 1996, pp. 241–243.

Cheng et al., "Securing the Internet Protocol", Proc. 5th USENIX UNIX Security Symposium, Salt Lake, Utah, 1995, p. 257.

Kung et al., "Developing an Object–Oriented Software Testing and Maintainance Environment", Communications of the ACM, vol. 38, No. 10, Oct. 1995, pp. 75–87.

SYSTEM AND METHOD FOR AN ISO7816 COMPLAINT SMART CARD TO BECOME MASTER OVER A TERMINAL

This application claims the benefit of the filing of U.S. Provisional patent application Ser. No. 60/051,326, filed Jun. 30, 1997.

BACKGROUND OF THE INVENTION

The invention relates to smart cards, and in particular to smart card control of terminal and network resources.

Smart cards are used for a variety of applications including electronic game cards, identification badges, and data storage media such as electronic books. The smart cards are typically encased in a tamper-resistant, plastic or metal housing about the size of a credit card and contain one or more embedded integrated circuit devices. Terminals, such as ID verification systems and electronic video games, etc., are available with one or more smart card interfaces that permit connection of the smart card to the terminal.

In traditional systems, the terminals or terminal device accesses the smart card through standard protocols, such as the ISO 7816 protocol. These protocols usually limit the smart cards to the role of "slave", while the terminal or terminal device acts as the "master". This means that the smart card cannot initiate any action or communication, but can only respond to specific commands from the terminal. A prior art terminal typically starts in the idle state (ST11), as shown in FIG. 1. The terminal then transmits a command to the smart card (ST12), and then waits for a response (ST13). After receiving the response from the smart card (ST14), the terminal returns to the idle state (ST11). Similarly, as shown in FIG. 2, a prior art smart card begins with the smart card waiting for a command from the terminal (ST21). Upon receiving the command from the terminal (ST22), the smart card proceeds to prepare an appropriate response (ST23), transmits the response to the terminal (ST24), and returns to the wait state (ST21) to await the next command. Under the above scheme, there is no provision for the smart card to access resources controlled by the terminal.

European Patent Application Document EP-A-662 674 discloses a smart card transaction system in which the traditional master-slave relationship is reversed. EP-A-662 674 proposes a transaction processing system which consists of "master" elements that control a specific transaction and "slave" elements that respond to the master to execute the transactions. In EP-A-662 674 the master elements are arranged in the cards and the slave elements in the terminals. During the processing of a transaction, it is possible for a card operating in master mode, to go to slave mode and vice versa.

SUMMARY OF THE INVENTION

In general, in one aspect, the invention relates to a smart card system. The system has a terminal and a smart card that is connected to the terminal and configured to initiate communication with the terminal. The smart card communicates with the terminal using a communications protocol that enables asynchronous communications between the smart card and the terminal. For systems that do not support asynchronous communication, the communications protocol also enables logical asynchronous communications. The system further comprises means for establishing fall-duplex or logical fall-duplex communication between the smart card and the terminal. The terminal may be connected to a host computer which is in turn connected to a network. The smart card can access the resources connected to the terminal, the host computer, and the network.

In general, in another aspect, the invention relates to a smart card that has a communications circuit and a microcontroller. The microcontroller is configured to initiate communication with a terminal to which the smart card is connected. The smart card also has a storage unit that stores programs that are executed by the microcontroller and a memory unit that temporarily stores the programs. The terminal may be connected to a host computer and a network, and the smart card may access the resources connected to the terminal, the host computer, and the network.

In general, in another aspect, the invention relates to a method of operating a smart card. The method comprises transmitting a command from the smart card to the terminal, waiting for a response from the terminal, and receiving the response from the terminal. The smart card initiates communication with the terminal. A communications protocol, which may be configured to be ISO 7816 compatible, allows the smart card to communicate asynchronously with the terminal, or logically asynchronously with the terminal in cases where the actual asynchronous communication is not available. Additionally, the communication may occur in fall-duplex mode. If a response is not received within a predefined time period, the smart card re-transmits the command. The method also comprises requesting a list of available services from the terminal and selecting a command based on the list of services.

In general, in another aspect, the invention relates to a method of debugging a smart card. The method includes executing a diagnostic portion of a program stored on the smart card, receiving a result from the smart card, and comparing the result with an expected result. The method further includes displaying the result on a terminal display.

Advantages of the invention include at least the following: smart card control of terminal, host computer, and network resources; smart card-initiated communication with a terminal, host computer, and network; and asynchronous communication between a smart card and a terminal, host computer, and network. Other advantages will become apparent from the below description and the following claims.

DETAILED DESCRIPTION OF THE PREFERRED EMBODIMENT

Throughout the description and the drawings, elements which are the same will be accorded the same reference numbers.

Figure 1:
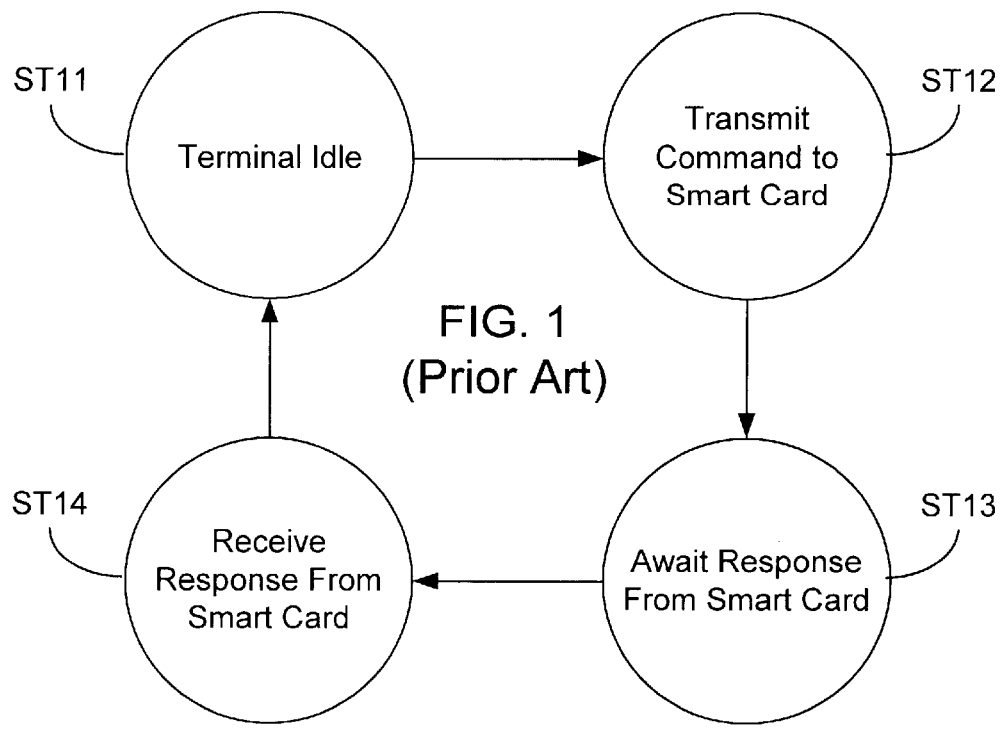
FIG. 1 is a state machine diagram of a prior art terminal.
Figure 2:
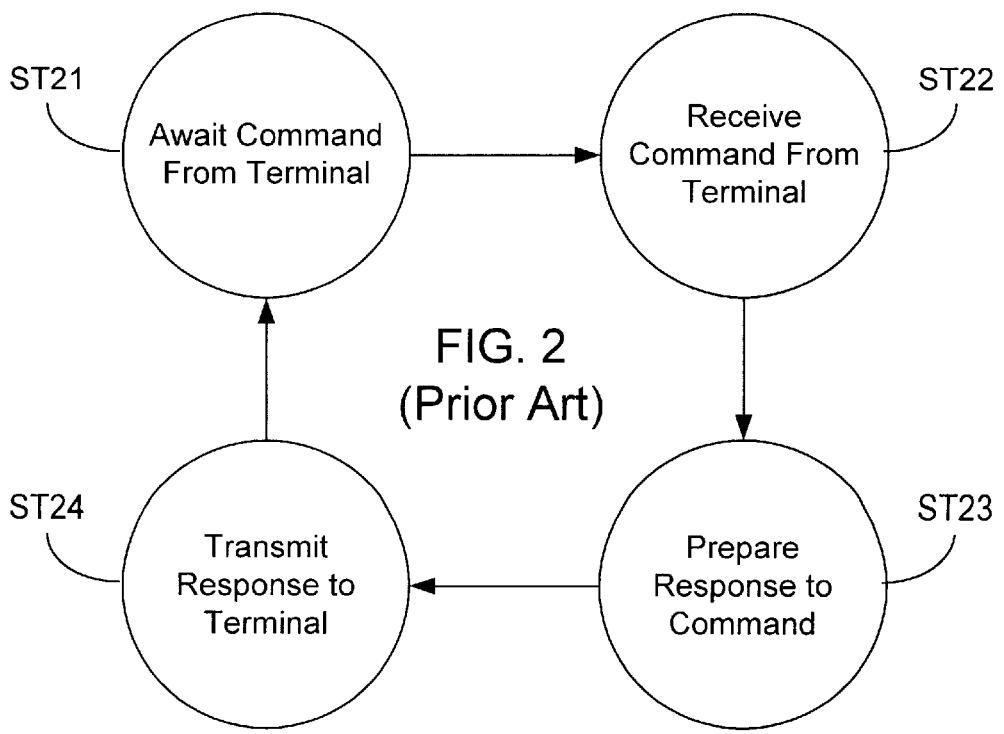
FIG. 2 is a state machine diagram of a prior art smart card.
Figure 3:
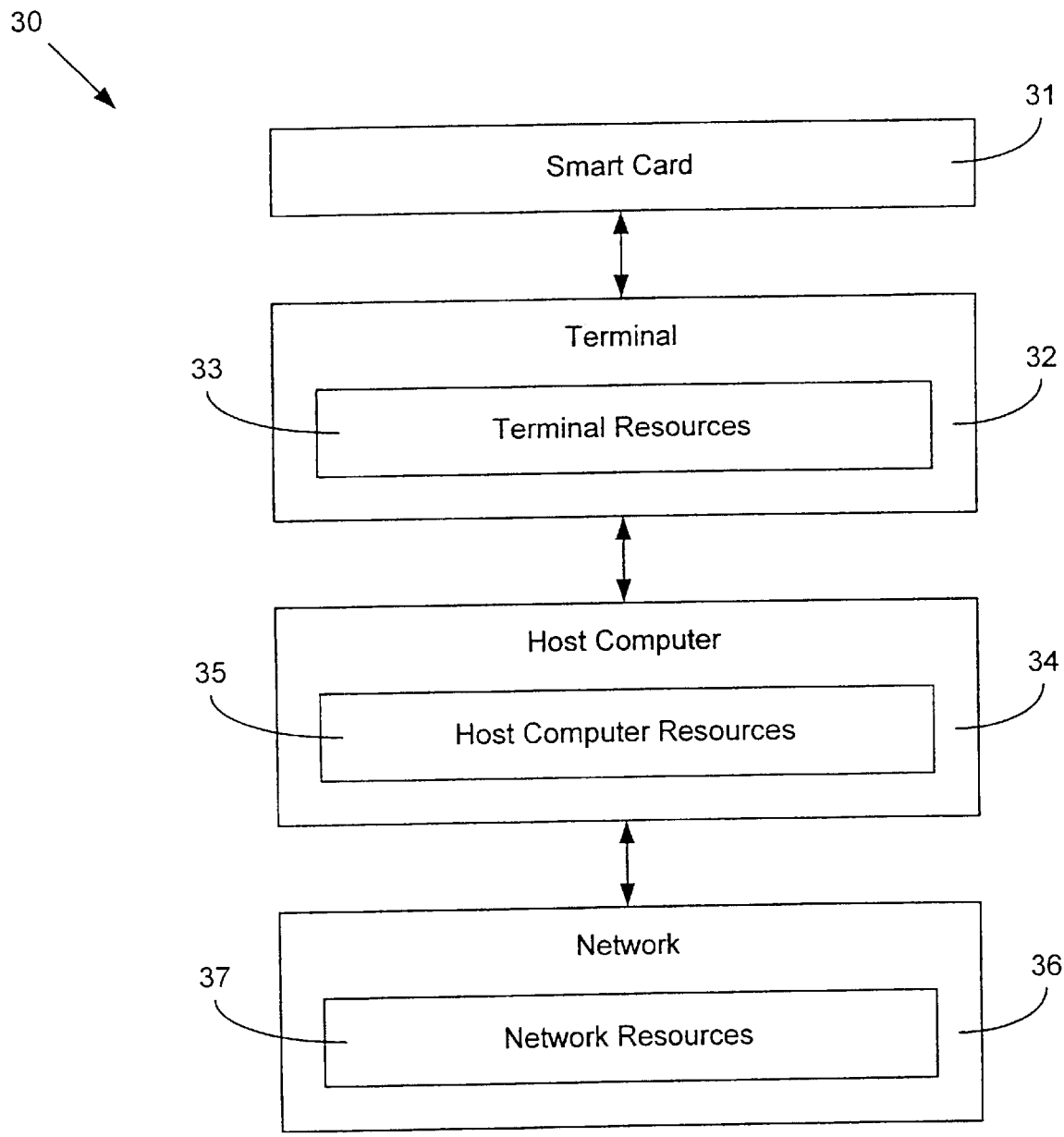
FIG. 3 is a block diagram of a smart card system.

Referring to FIG. 3, a smart card systems 30 has a smart card 31 connected to a terminal 32 which has terminal resources 33 available. The terminal resources 33 may be very minimal, such as an input/output port for connecting to a host computer, or the resources 33 could be more extensive, for example, a keyboard, monitor, modem, cash dispenser, and other specialized resources.

In some systems, the smart card 31 and the terminal 32 operate independently of any other devices. This is exemplified by portable value checker products which allow a particular value in the smart card 31 to be displayed by the terminal, and portable Mondex transaction devices which allow two smart cards 31 to be connected to a single terminal 32, and to transfer data between the two cards 31.

In other systems, the terminal resources 33 connect the terminal 32 to a host computer 34, which has certain host computer resources 35 available. These resources could include a network connection, keyboard, monitor, hard disk, and other types of resources common to computers or specialized for a particular application. The smart card 31 can send commands to, and receive responses from, the host computer 34 through the terminal 32, and vice-versa.

The host computer 34 optionally can be connected to a network 36 if the host computer resources 35 include a network port. This allows the host computer 34 to gain access to network resources 37, which include other computers, printers, storage devices, and other potential resources, including for example resources available on the Internet. In such systems, the smart card 31 can be used as a tamper-resistant storage unit for network passwords, keys, certificates, electronic cash, and other information which the host computer 34 uses for network access, electronic commerce, and other types of network applications.

Figure 4:
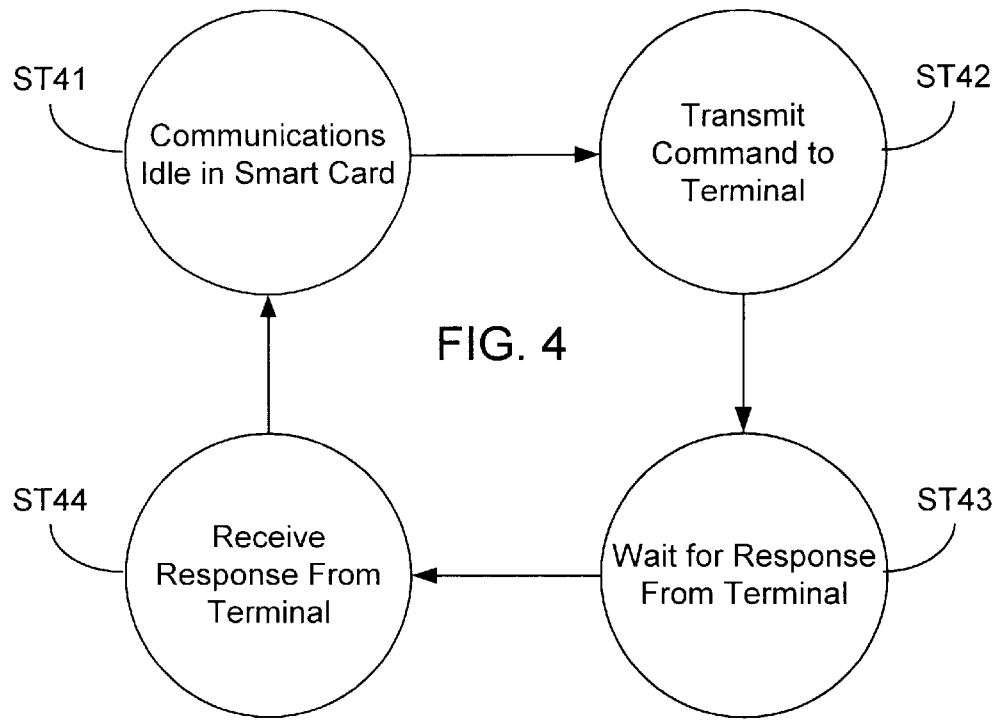
FIG. 4 is a state machine diagram of the smart card of the present invention.
Figure 5:
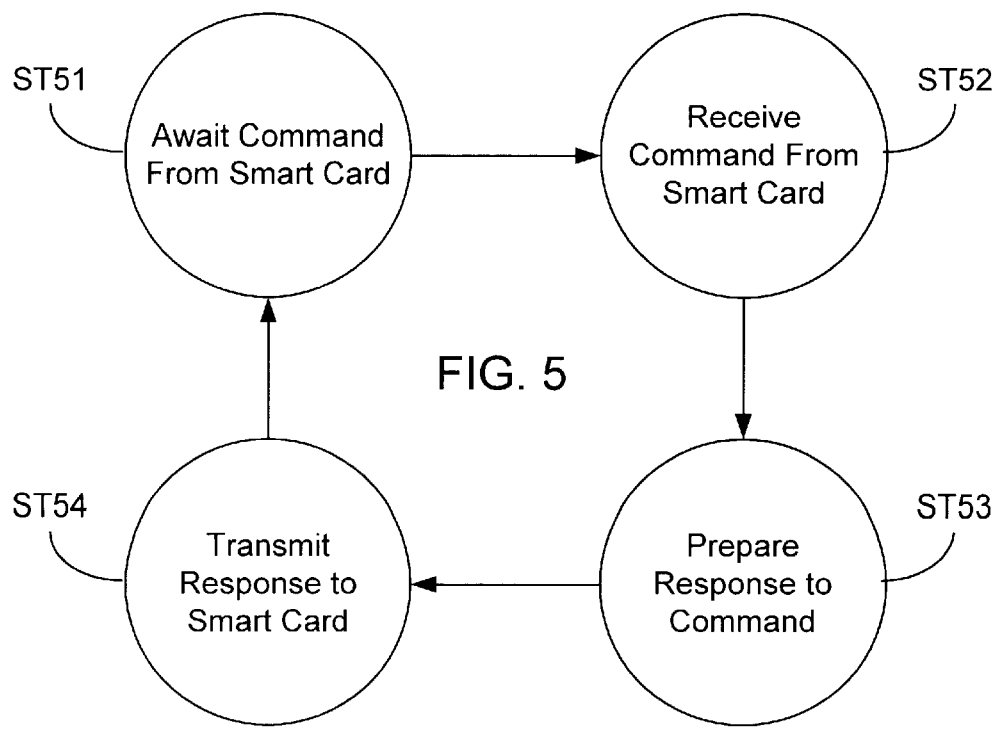
FIG. 5 is a state machine diagram of the terminal of the present invention.

An advantage of the smart card 31 is that it is able to initiate communication with the terminal 32 and thereby become a "master" while the terminal 32 acts as a "slave", as illustrated in FIG. 4 and FIG. 5. Referring to FIG. 4, communications is in an idle state in the smart card 31 while the smart card 31 is processing data or waiting for some event to occur (ST41). When the smart card 31 needs to communicate with the terminal 32, it transmits a command (e.g., a display data command), or a message, or a packet of information to the terminal (ST42). After the transmission, the smart card 31 waits (ST43) until it receives a response (ST44) from the terminal 32 (e.g., an acknowledgement of the command). Once the response has been received, the smart card 31 returns to the idle state (ST41) until the card needs to communicate with the terminal 32 again. Under such a scheme, the smart card 31 may initiate communication with the terminal at any time. For example, if data or information from the terminal 32 which is needed by the smart card 31 to carry out a certain task is missing or incomplete, rather than remain in an idle state awaiting further data transfer, the smart card 31 can act proactively and request the missing information from the terminal 32.

Referring to FIG. 5, terminal 32 waits in an idle state for a command from the smart card 31 (ST51). When a command is detected, the terminal 32 receives the command and prepares an appropriate response (ST52 and ST53). The terminal 32 then transmits the response to the smart card 31 (ST54) and returns to the idle state to await receipt of another command (ST51).

In a similar way, the smart card 31 may access host computer resources 35 and network resources 37 by issuing, for example, a print command to a printer resource or a send network message command to a network messaging resource.

In some cases, it may be desirable to add time-out features to the smart card 31 so that if a response is not received in the allotted time, the smart card 31 takes alternative actions, such as re-transmitting the command or transmitting a different command.

Figure 6:
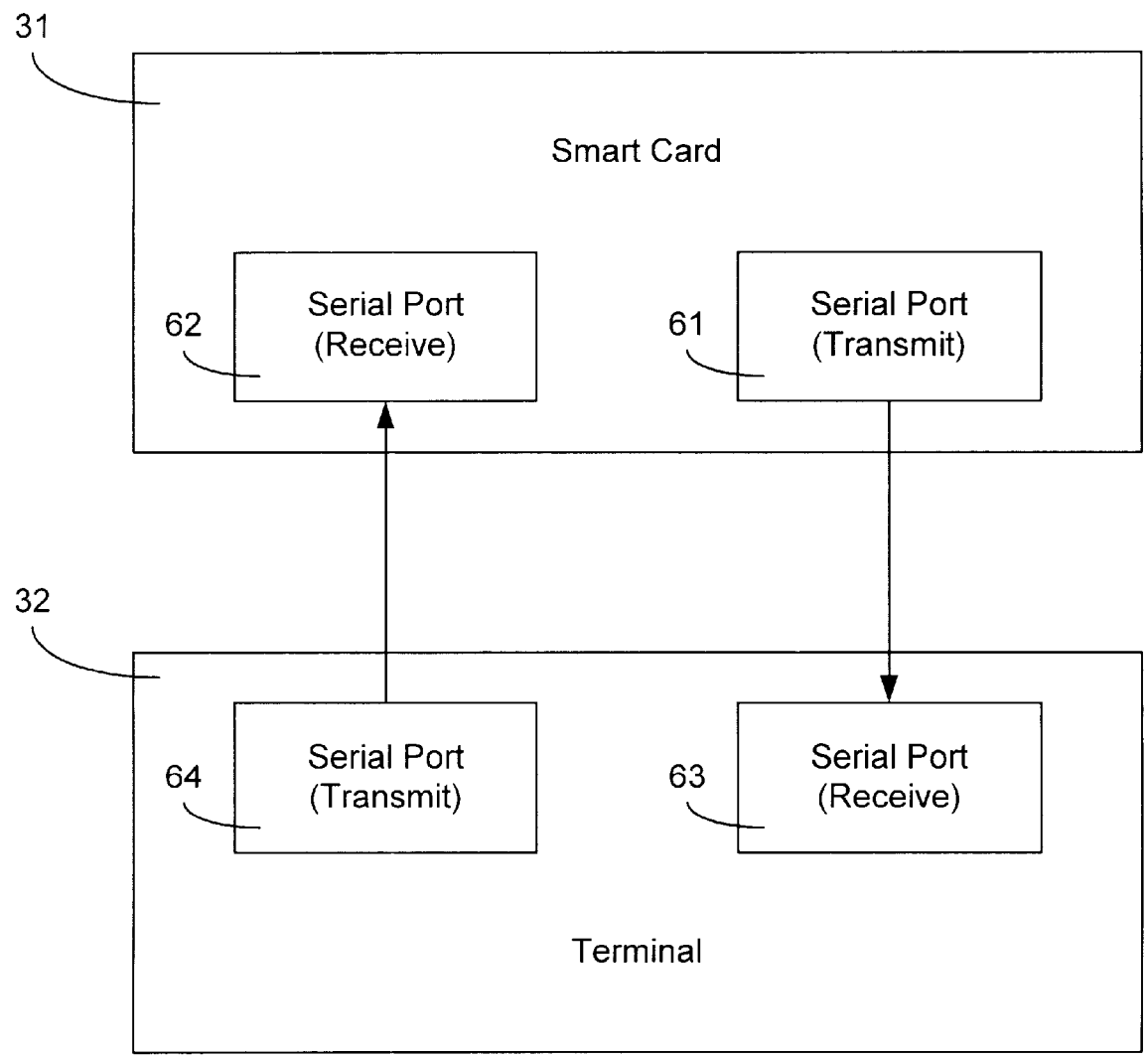
FIG. 6 is a block diagram of a smart card communications scheme.

It should be noted that the state machine diagrams of FIGS. 4 and 5 represent systems with only half-duplex communication between the smart card 31 and terminal 32. Alternative systems may, of course, be designed to support full-duplex communication between the smart card 31 and terminal 32. For example, referring to FIG. 6, fall-duplex communication between the smart card 31 and the terminal 32 may be implemented using two conventional RS-232 serial ports in both the smart card 31 and terminal 32. Serial ports 61 and 62 of the smart card 31 transmit and receive data to and from serial ports 63 and 64 in the terminal 32, respectively. Because the transmissions in one direction are independent in time relative to the transmissions in the other direction, the smart card 31 and the terminal 32 may communicate with each other asynchronously.

In contrast, systems that have only half-duplex physical channels are generally limited to synchronous communication and typically require synchronous communication protocols, e.g., the ISO 7816 protocol. However, such a system may implement a special low level protocol which appears as an asynchronous protocol interface to the higher level protocols. This will allow the devices in the system to communicate with each other and with external devices using high level protocols which require asynchronous communications. For example, a "polling protocol" may be used with a smart card 31 and a terminal 32 that support the ISO 7816 half-duplex low level protocols. In the polling protocol, the terminal 32 has an obligation to send packets to the smart card 31 at the earliest possible opportunity. In the case where there is no terminal data to be sent, a special class of instruction code may be sent to indicate to the smart card 31 that this is only a polling packet. If the smart card 31 is ready to send data to the terminal 32, it sends a response to the terminal 32 containing a byte which indicates the length of the data the smart card 32 is ready to send. The terminal 32 then responds with a special packet having a length which is equal to the length indicated by the smart card 31. This then allows the smart card 31 to send its data to the terminal 32, effectively allowing the smart card 31 to initiate communication with the terminal 32. The polling may be repeated at the maximum rate that is supported by the terminal 32. Such a low level protocol may be augmented by marking each message in each direction with a unique identifier, for example, a sequence number. This allows the responses in either direction to be deferred and sent later using the sequence number to correlate with the original messages. For example, if the terminal sent a message requiring a response, at the low level protocol the smart card could continue communicating other messages back and forth. Then, when the desired response is ready, the smart card 31 marks the response with the identification number of the initiating message. When the terminal 32 receives the response, it correlates the response with the original message and returns the response value to the thread that initiated the message. Such a scheme also may permit the original thread to continue execution without waiting for the response, and allows the response to be passed back to the thread (or to another designated thread) using a callback mechanism. It will be appreciated that this logically presents what appears to be a full asynchronous interface to the higher level protocols.

Asynchronous communication between the smart card 31 and the terminal 32 allows more complex systems to be designed. For example, conventional packet protocols exist which would allow packets to be initiated by both the smart card 31 and terminal 32, which may result in multiple packets that are in various states of processing occurring at the same time. This permits the use of high level features such as multi-threaded communications and callbacks. In short, FIG. 4 and FIG. 5 are illustrative of the simplest state machines that implement smart card initiated communications, which is the key to this invention. It is well understood that other state machines for both half-duplex and fall-duplex communications can be devised, as well as non-state based protocols, and are intended to fall within the scope of this invention if such communication protocols include card initiated communication. Since low level protocols based on this invention could allow asynchronous communication between the smart card 11 and the terminal 12, this can further enable high level communication protocols, such Remote Procedure Call and Remote Message Invocation, to be used. Such protocols can greatly enhance the value of the smart cards for many applications. In short, FIG. 4 and FIG. 5 illustrate only the simplest systems that implement smart card-initiated communications. Other systems having both half-duplex and full-duplex communications may be devised that, so long as they include smart card-initiated communication, are within the scope of the invention.

Figure 7:
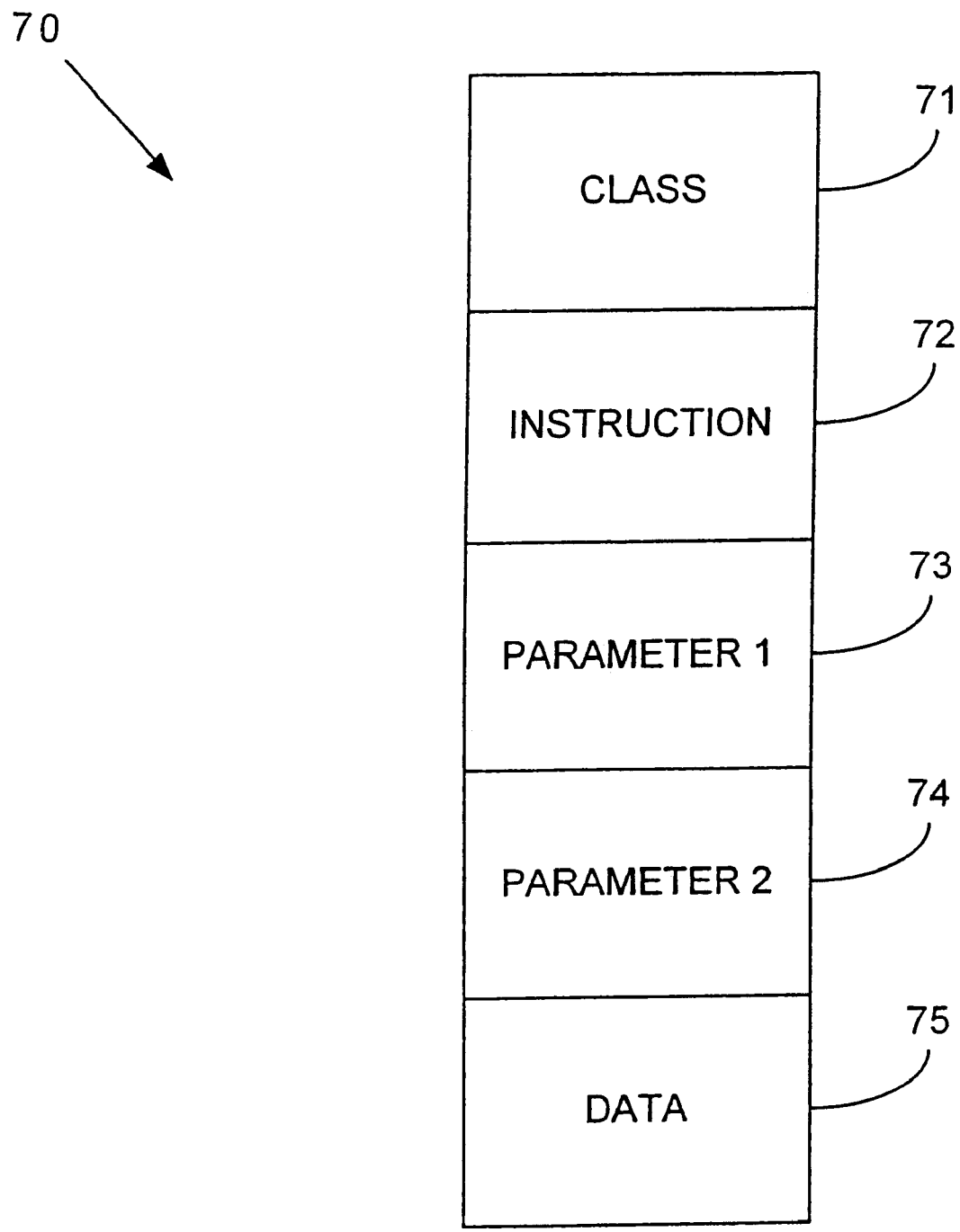
FIG. 7 illustrates a smart card communications protocol.

In another embodiment, a communications protocol, shown generally at 70 in FIG. 7 and in more detail in TABLE 1, defines the commands that the smart card can initiate with respect to the terminal, host computer, or network. The communications protocol 70 uses ISO 7816 escape commands with the existing ISO 7816 protocol to generate a new set of smart card-initiated commands. The use of the ISO 7816 escape commands allows the communications protocol 70 to retain backwards compatibility with standard ISO 7816 commands. Each command in the communications protocol 70 is comprised of the following ISO 7816 fields: a class (CLA) field 71, an instruction (INS) field 72, a first parameter (P1) field 73, a second parameter (P2) field 74, and a data (Data) field 75. Not every field is required for every command and some fields may be either left empty or filled with a null value. The fields themselves are standard ISO 7816 fields well known to one having ordinary skill in the art and will not be described here.

The commands of the communications protocol 70 may be defined broadly such that not every terminal, host computer, network, or the resources connected thereto will have the service requested. When a particular service is not available, the communications protocol 70 includes an error message which may be sent back to the smart card to indicate that the requested service is not available. In one embodiment, the communications protocol 70 includes a query command so that the smart card can query the terminal, host computer, or network to determine which services are available. In addition, the communications protocol 70 may use a global naming convention (e.g., the Domain Name Service (DNS)) such that the smart card may specify a particular resource on a global basis.

Referring to TABLE 1, the commands defined in the communications protocol 70 include the following: Display Request, Activate Input Scan, Request Data Length in Buffer, Request Data in Buffer, Activate Secure ID Entry, Query Resources, and Send Network Message. The Display Request command allows the smart card to display information on the terminal, host computer, or network display device. A Java program implementing this command using the standard Java Card 1.0 specification is shown in Appendix A. The Activate Input Scan command scans for user input. The Request Data Length in Buffer command, which may be executed at any time, determines the length of the data in the input buffer. The Request Data in Buffer command reads the data entered in the terminal, host computer, or network input buffer. The Request a Secure ID Entry command requests identification information such as a username, password, or biometrics information such as a thumbprint or voiceprint. The Query Resources command, as indicated above, queries the terminal, host computer, or network for available services and resources. This command may also be used to determine other information such as available user input devices, secure ID devices, network connectivity, data files, database availability, and other types of services were resources. The Send Network Message command sends a message to a network computer which is identified by the standard DNS node ID convention. This command is sent from the smart card to the host computer, which must either receive and execute this command or return an error response to the smart card. If the network computer identified is the host computer, then the command is executed locally. Otherwise, the host computer routes the command through the network to the identified network computer.

TABLE 1

Communications protocol: Mapping To ISO 7816 Escape Commands

| Command Type | CLA | INS | P1 | P2 | Data | Response |
| --- | --- | --- | --- | --- | --- | --- |
| Display Request | D0 | E0 | Fm | Lc | Disp Data | 90 00 (OK) |
| | | | | | | 6F 00 (Error) |
| Activate Input Scan | D0 | E1 | 00 | 00 | None | 90 00 (OK) |
| | | | | | | 6F 00 (Error) |
| Request Data Length In Buffer | D0 | E2 | 00 | 00 | None | Length + 90 00 (OK) |
| | | | | | | 6F 00 (Error) |
| Request Data in Buffer | D0 | E3 | 00 | Ln | None | InputData + 90 00 (OK) |
| | | | | | | 6F 00 (Error) |
| Activate Secure ID Entry | D0 | E4 | 00 | 00 | None | Length + IDData + 90 00 (OK) |
| | | | | | | 6F 00 (Error) |
| Query terminal Resources | D0 | E5 | Rs | 00 | None | Length + ResData + 90 00 (OK) |
| | | | | | | 6F 00 (Error) |
| Send Network Message | D0 | E4 | Ld | Lm | ID + Msg | Length + Response + 90 00 (OK) |
| | | | | | | 6F 00 (Error) |

The communications protocol 70 may, of course, be expanded as required to support other services. Furthermore, for systems that use fall-duplex communication between the smart card and the terminal and do not require ISO 7816 compatibility, standard asynchronous callback mechanisms can be added to the protocol to expand functionality and improve performance greatly. For example, instead of sending a network message and waiting for a response, the smart card can continue normal processing. Once the response has been prepared by the DNS node that received the message, an asynchronous response message can be sent to the smart card. Other half-duplex and full-duplex communications protocols can be devised readily and are intended to fall within the scope of this invention if such communications protocols include card initiated communication. For example, a logical full-duplex scheme may be devised for systems that do not have actual full-duplex.

Figure 8:
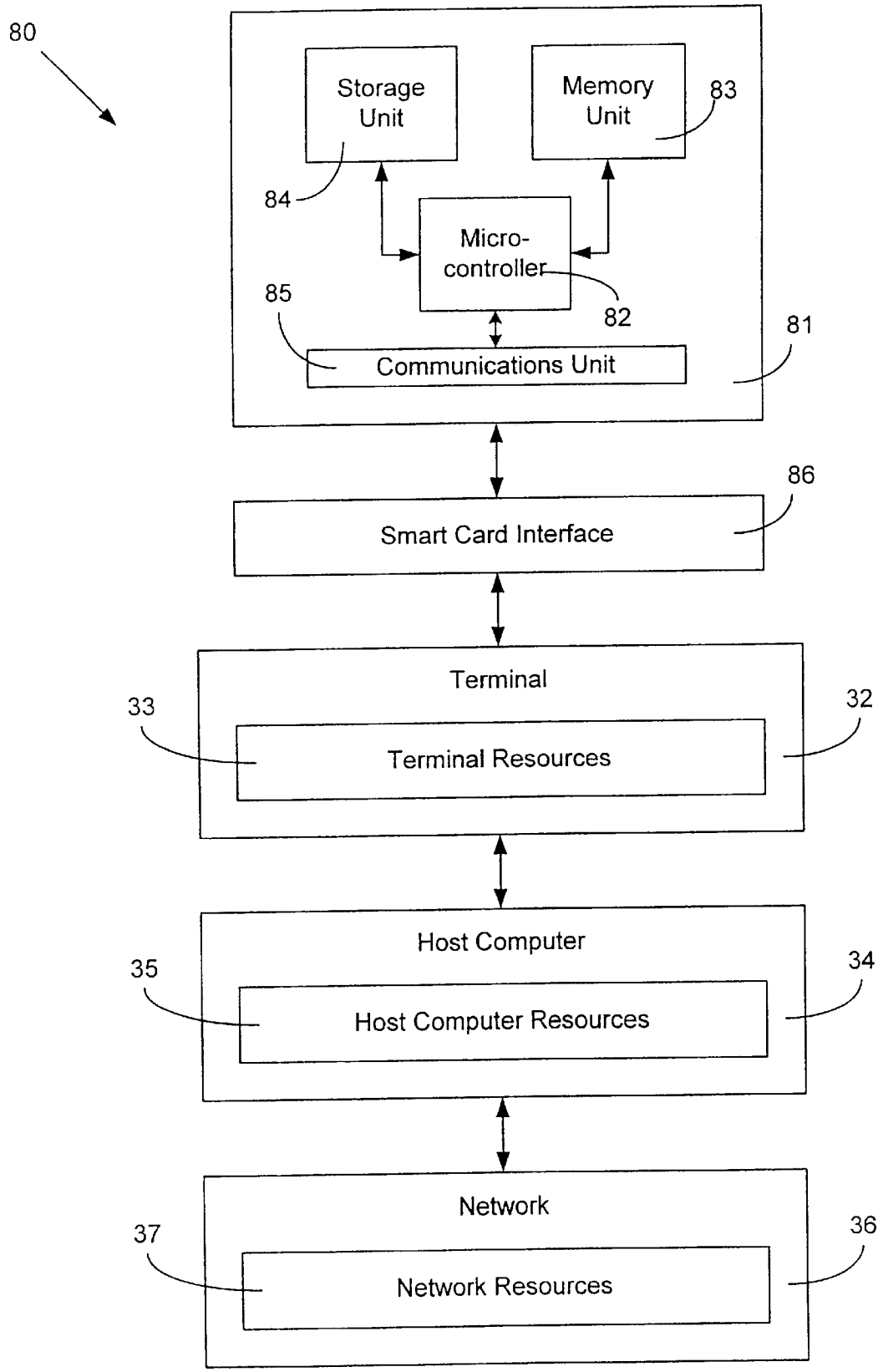
FIG. 8 is another embodiment of the smart card system.

Referring to FIG. 8, another embodiment of a smart card system 80 comprises a smart card 81 connected to a smart card terminal 32. The smart card 81 has an embedded microcontroller 82, memory unit 83, and storage unit 84, all of which are interconnected. The microcontroller 82 executes smart card software and programs, carries out terminal instructions, and generally manages the flow of data to and from the smart card 81. In some embodiments, the microcontroller 82 may include a microprocessor (e.g., a 68HC05), a programmable array logic (PAL), an application-specific integrated circuit (ASIC), and/or other integrated circuit devices. The memory unit 83, which may include a random-access-memory (RAM), temporarily stores software and data used by the microcontroller 82 during program execution. The storage unit 84, which may include a read-only memory (RO), stores the basic program codes and data that are needed to configure and operate the smart card 31. New or updated codes and data may be downloaded or programmed into the smart card 81 from time to time to upgrade the smart card 81. The smart card 81 also has a communications unit 85 that is connected to the microcontroller 82 and allows the microcontroller 82 to transfer data to and from the terminal 32 and other external devices. Although shown as separate blocks, the microcontroller 82, memory unit 83, storage unit 84, and communications unit 85 may be combined into a single integrated circuit device or an otherwise reduced or expanded number of separate IC devices.

The smart card 81 is connected to the terminal 32 by a smart card interface 86 which facilitates communication between the smart card 81 and the terminal 32. The interface 86 typically includes a smart card reader or reader/writer and a power supply, such as a battery, (not shown) that provides power to the smart card 81. In some embodiments, the interface 86 physically engages the smart card 81. In other embodiments, however, the interface 86 may use inductive, capacitive, or optical coupling, or the interface 86 may use radio frequency signals to connect the smart card 81 to the terminal 32.

Figure 9:
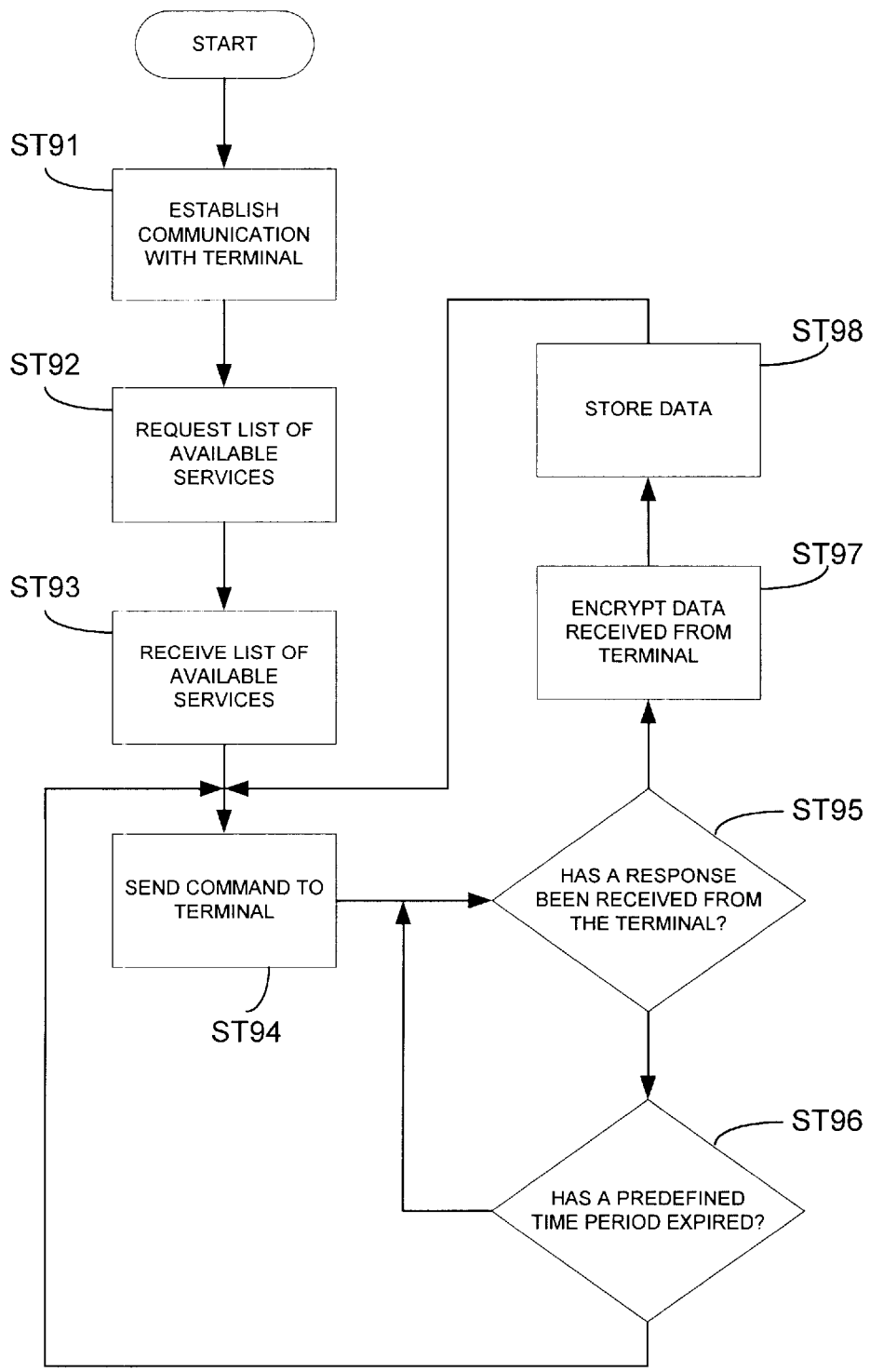
FIG. 9 is a method of operating a smart card.

In operation, the smart card 81 is able to access and control the terminal 32 and terminal resources 33 by initiating communication with the terminal 32 and terminal resources 33, contrary to conventional smart cards that only respond to received commands. Referring to FIG. 9, communication between the smart card 31 and the terminal 36 is established, for example, via an electronic handshake or series of handshakes (ST91). The smart card 81 than requests a list of available services from the terminal 32 (ST92). The list of services may vary depending on the type of terminal 32 (e.g., a video game, security system, etc.) and terminal resources 33. Once the list of available services or commands is received from the terminal 32 (ST93), the smart card 81 sends a command to the terminal 32 based on the services that are available (ST94). The smart card 81 then checks to see if a response to the command has been received from the terminal 32 (ST95). If a response has been received, the smart card 81 encrypts (ST97) and stores (ST98) any data received from the terminal 32, and prepares itself to send another command to the terminal 32 (ST94). If not, the smart card 81 checks to see if a predefined time period has expired or timed out (ST96). If the predefined time period has expired, then the smart card 81 re-transmits the command to the terminal 32 (ST94). If the predefined time period has not expired, the smart card 81 checks again to see if the response has been received from the terminal 32.

The smart cards described above facilitate a wide range of new and innovative smart card applications heretofore unrealizable with conventional smart card architectures. Three such applications are disclosed below.

Figure 10:
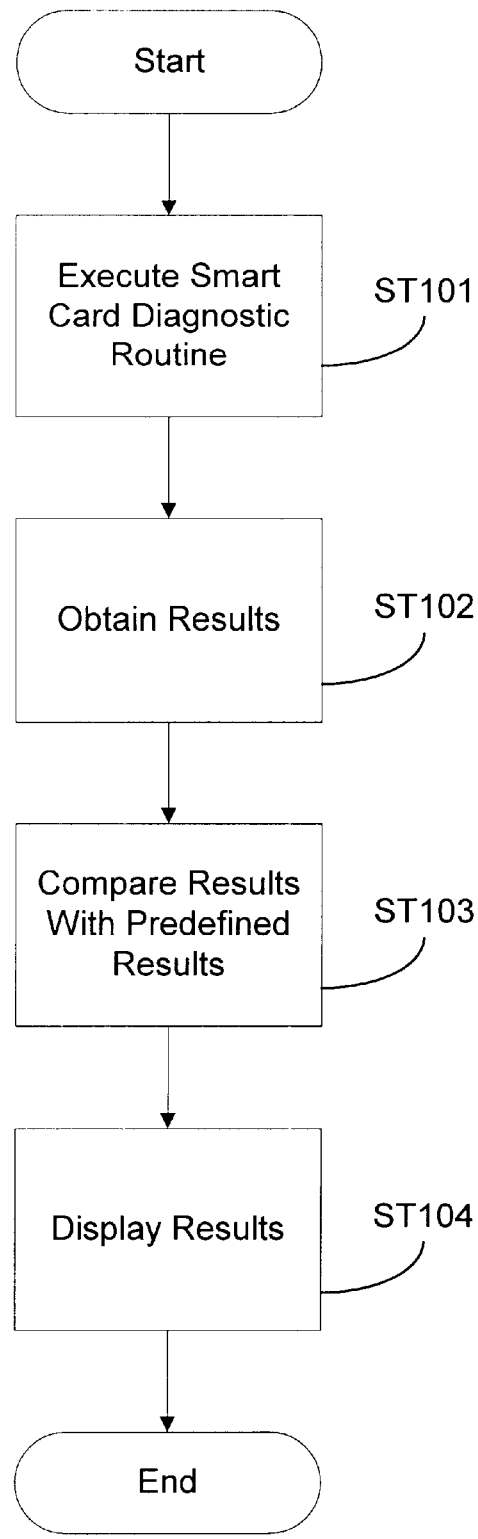
FIG. 10 is another method of operating a smart card.

Smart card programs are typically very difficult to develop and debug due to the lack of visibility into the cards necessitated by the strict security requirements of most smart card applications. The ability of the smart card to drive the terminal allows one having ordinary skill in the art to develop debugging applications that are resident on the card and program test harnesses to exercise difficult to reach sections of smart card code. Such applications can make use of a terminal display to provide internal state and runtime trace information to assist in debugging card resident applications. Referring to FIG. 10, one such application begins with executing a debugging routine (ST101), for example, a memory test routine. After running the routine, the smart card outputs a result (ST102), such as, e.g., the number of rows and columns in the memory unit that passed the test. The results are compared with a known or predefined number of good rows and columns (ST103) and the results are displayed on the terminal display (ST104). In some embodiments, the user may use a terminal input device to select different sections of the smart card's program to execute.

Network games traditionally have suffered from a lack of security, which allows devious players to manipulate stored data to enhance game attributes to the detriment of other players. This can result in general dissatisfaction with the game itself. The solution employed in some cases is to require all players to access a secure host computer which stores the gaming files; however, this slows down the host computer and limits the number of simultaneous players per game. With a smart card that is able to interact fully with the user and the network, a game may be stored and executed entirely on the smart card. Such a game benefits from the secure environment provided by the smart card and does not require a secure host. This removes the limit on the number of simultaneous players. Also, each player may interact directly with other players and be confident that the gaming information stored on the opponent's smart card is free from tampering.

Solitaire games which reward high scores also are subject to such tampering by devious players, which has discouraged the deployment of such games. However, with the game and data files, including the prize validation information, stored securely and executed in a smart card, these solitaire games can become more viable with dishonest play prevented and honest levels of achievement appropriately rewarded.

It is to be understood that the embodiments described above are merely illustrative and that other arrangements can be devised by one of ordinary skill in the art at the time the invention was made without departing from the scope of the invention.

What is claimed is:

1. A method of operating a smart card and smart card terminal allowing asynchronous communication between the smart card and smart card terminal such that either the smart card or the smart card terminal may operate as master and the other operating as slave wherein the communication between the smart card and the smart card terminal is according to the ISO 7816 communications protocol, wherein the smart card may operate in a state of expecting an instruction from the smart card terminal, comprising:

operating the smart card in a wait mode, wherein the smart card is waiting for the smart card terminal to issue a command;

prior to receiving a command from the smart card terminal, while waiting for the smart card terminal to issue a command, transmitting an ISO 7816 escape sequence command to the smart card terminal indicating to the smart card terminal that the smart card has become the master.

2. The method of operating a smart card and smart card terminal of claim 1, wherein the escape sequence command is selected from a set of commands that includes Display Request, Activate Input Scan, Request Data Length In Buffer, Request Data in Buffer, Activate Secure ID Entry, Query Terminal Resources, Send Network Message.

3. The method of operating a smart card and smart card terminal of claim 1, further comprising:

issuing an ISO 7816 escape command from the smart card to the smart card terminal to query the smart card terminal as to which services are available.

4. The method of claim 3, where in the step of issuing a query command includes issuing a command to query information selected from a set including availability of user input devices, availability of secure ID devices, network connectivity, availability of data files, availability of database.

5. The method of operating a smart card and smart card terminal of claim 3, wherein in response to the issued command to query the smart card terminal as to which services are available, the smart card terminal responds to the query with a list of available services.

6. The method of operating a smart card and smart card terminal of claim 1, further comprising:

issuing from the smart card to a host computer connected to the smart card terminal an ISO 7816 escape sequence mapped to a Send Network Message command for transmitting a message from the smart card to a networked computer identified by standard DNS node ID convention;

receiving at the host computer the ISO 7816 escape sequence mapped to a Send Network Message command;

if the networked computer identified in the Sent Network Message command is the host computer, causing the host computer to execute the command or issue an error response to the smart card;

if the networked computer identified in the Sent Network Message command is not the host computer, causing the host computer to route the command to the identified networked computer.

7. A smart card system having asynchronous communication between a smart card and a smart card terminal such that either the smart card or the smart card terminal may operate as master and the other operating as slave, comprising:

means located on the smart card for communicating with the smart card terminal according to the ISO 7816 communications protocol;

means located on the smart card terminal for communicating with the smart card according to the ISO 7816 communications protocol;

the smart card having a means for transmitting an ISO 7816 escape sequence command to the smart card terminal indicating to the smart card terminal that the smart card has become the master while the smart card operates in a state of expecting an instruction from the smart card terminal.

8. The smart card system of claim 7, wherein the escape sequence command is selected from a set of commands that includes Display Request, Activate Input Scan, Request Data Length In Buffer, Request Data in Buffer, Activate Secure ID Entry, Query Terminal Resources, Send Network Message.

9. The smart card system of claim 7, further comprising:

means for issuing an ISO 7816 escape command from the smart card to the smart card terminal to query the smart card terminal as to which services are available.

10. The smart card system of claim 9, wherein the means for issuing a query command includes means for issuing a command to query information selected from a set including availability of user input devices, availability of secure ID devices, network connectivity, availability of data files, availability of database.

11. The smart card system of claim 9, further comprising means operable to cause, in response to the issued command to query the smart card terminal as to which services are available, the smart card terminal responds to the query with a list of available services.

12. The smart card system of claim 7, further comprising:

means for issuing from the smart card to a host computer connected to the smart card terminal an ISO 7816 escape sequence mapped to a Send Network Message command for transmitting a message from the smart card to a networked computer identified by standard DNS node ID convention;

means for receiving at the host computer the ISO 7816 escape sequence mapped to a Send Network Message command;

means for, if the networked computer identified in the Sent Network Message command is the host computer, causing the host computer to execute the command or issue an error response to the smart card; and means for, if the networked computer identified in the Sent Network Message command is not the host computer, causing the host computer to route the command to the identified networked computer.

* * * * *

UNITED STATES PATENT AND TRADEMARK OFFICE
CERTIFICATE OF CORRECTION

PATENT NO. : 6,157,966
DATED : December 5, 2000
INVENTOR(S) : Montgomery et al.

It is certified that error appears in the above-indentified patent and that said Letters Patent is hereby corrected as shown below:

In the title of the application change "COMPLAINT" to --COMPLIANT--.

Signed and Sealed this

First Day of May, 2001

Attest:

NICHOLAS P. GODICI

*Attesting Officer*          *Acting Director of the United States Patent and Trademark Office*